(12) United States Patent
Kong et al.

(10) Patent No.: US 8,255,209 B2
(45) Date of Patent: Aug. 28, 2012

(54) NOISE ELIMINATION METHOD, APPARATUS AND MEDIUM THEREOF

(75) Inventors: Donggeon Kong, Yongin-si (KR); Changkyu Choi, Seoul (KR); Kiyoung Park, Daejeon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 647 days.

(21) Appl. No.: 11/188,707

(22) Filed: Jul. 26, 2005

(65) Prior Publication Data

US 2006/0106601 A1 May 18, 2006

(30) Foreign Application Priority Data

Nov. 18, 2004 (KR) .................. 10-2004-0094556

(51) Int. Cl.
*G10L 21/02* (2006.01)
*G10L 15/00* (2006.01)
*H04R 3/00* (2006.01)

(52) U.S. Cl. .................. 704/226; 704/233; 381/92

(58) Field of Classification Search .................. 704/226
See application file for complete search history.

(56) References Cited

U.S. PATENT DOCUMENTS

| | | | | |
|---|---|---|---|---|
| 4,908,865 A * | 3/1990 | Doddington et al. | ......... | 704/241 |
| 5,706,394 A * | 1/1998 | Wynn | ............... | 704/219 |
| 5,933,801 A * | 8/1999 | Fink et al. | ...................... | 704/208 |
| 6,292,654 B1 * | 9/2001 | Hessel et al. | .................. | 455/223 |
| 6,801,161 B2 * | 10/2004 | Lehtomaki et al. | ........... | 342/377 |
| 6,910,011 B1 * | 6/2005 | Zakarauskas | ................. | 704/233 |
| 7,050,776 B2 * | 5/2006 | Kim et al. | .................. | 455/277.1 |
| 7,171,240 B2 * | 1/2007 | Kim et al. | ...................... | 455/561 |
| 7,471,963 B2 * | 12/2008 | Kim et al. | .................. | 455/562.1 |
| 2002/0041678 A1 * | 4/2002 | Basburg-Ertem et al. | ........................ | 379/406.01 |
| 2002/0188442 A1 * | 12/2002 | Gass et al. | ..................... | 704/208 |
| 2004/0167777 A1 * | 8/2004 | Hetherington et al. | ....... | 704/226 |
| 2004/0220800 A1 * | 11/2004 | Kong et al. | .................... | 704/205 |
| 2005/0080619 A1 * | 4/2005 | Choi et al. | ..................... | 704/215 |
| 2005/0153659 A1 * | 7/2005 | Lee et al. | .................. | 455/67.13 |

FOREIGN PATENT DOCUMENTS

| KR | 2001-0032390 | 4/2001 |
|---|---|---|
| KR | 2004-0094300 | 11/2004 |

OTHER PUBLICATIONS

Lim et al, "Enhancement and Bandwidth Compression of Noisy Speech", 1979, IEEE, vol. 67, p. 1586-1604.*

(Continued)

*Primary Examiner* — Talivaldis Ivars Smits
*Assistant Examiner* — Olujimi Adesanya
(74) *Attorney, Agent, or Firm* — Staas & Halsey LLP

(57) ABSTRACT

A noise elimination method and apparatus. The method eliminates noise from an input signal containing a voice signal mixed with a noise signal. The method includes detecting a noise section, in which the noise signal is present, from the input signal; obtaining a weight to be used for the input signal from signals of the noise section; and filtering the input signal using the obtained weight. The method and apparatus enable a mobile robot to eliminate noise in real time and effectively detect and recognize voice.

10 Claims, 15 Drawing Sheets

OTHER PUBLICATIONS

El-Ayadi et al, "A Combined Redundancy Averaging Signal Enhancement Algorithm for Adaptive Beamforming in the presence of Coherent Signal", 1996, Elsevier Signal Processing, pp. 285-293.*

Wahlberg, B.G.; Mareels, I.M.Y.; Webster, I.; , "Experimental and theoretical comparison of some algorithms for beamforming in single receiver adaptive arrays," Antennas and Propagation, IEEE Transactions on , vol. 39, No. 1, pp. 21-28, Jan. 1991 doi: 10.1109/8.64430.*

Asono, F.; Asoh, H.; Matsui, T.; , "Sound source localization and signal separation for office robot "JiJo-2"," Multisensor Fusion and Integration for Intelligent Systems, 1999. MFI '99. Proceedings. 1999 IEEE/SICE/RSJ International Conference on , vol., No., pp. 243-248, 1999.*

* cited by examiner

FIG. 13
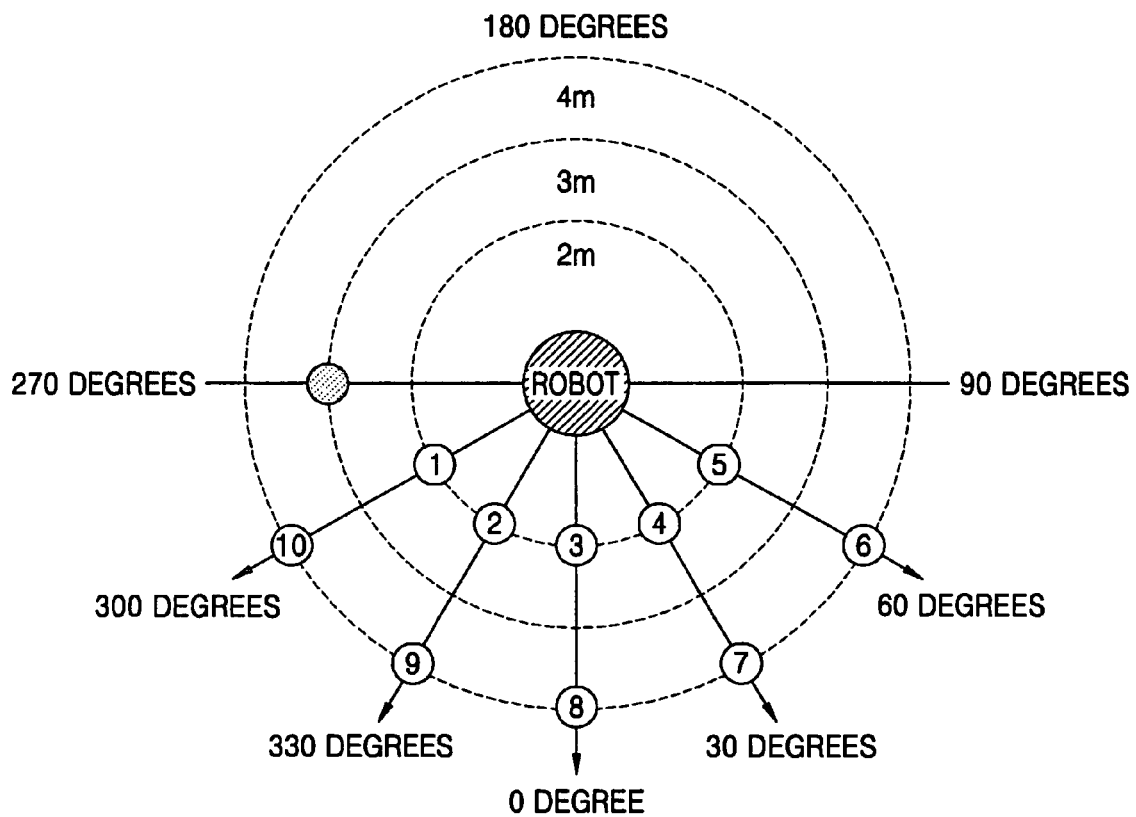
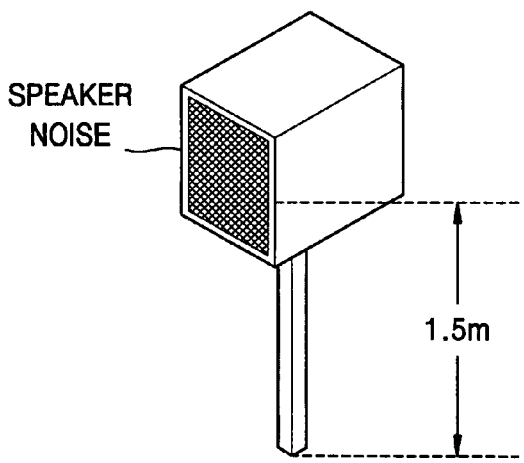

FIG. 14

|  | FAN (−3.2dB) | DANCING QUEEN (−1.41dB) | TORNA A SURRIENTO (−2.05dB) |
|---|---|---|---|
|  | #.CD DR | #.CD DR | #.CD DR |
| SINGLE CHANNEL VOICE ENHANCER + VAD | 51 94.63% | 335 51.86% | 292 51.59% |
| PRESENT INVENTION + (SINGLE CHANNEL VOICE ENHANCER + VAD) VAD FEEDBACK UNUSED | 540 100.00% | 489 90.56% | 460 85.19% |
| PERFORMANCE IMPROVEMENT | 5.37% | 38.70% | 33.60% |

# NOISE ELIMINATION METHOD, APPARATUS AND MEDIUM THEREOF

CROSS-REFERENCE TO RELATED APPLICATIONS

This application claims the priority of Korean Patent Application No. 2004-0094556, filed on Nov. 18, 2004, in the Korean Intellectual Property Office, the disclosure of which is incorporated herein in its entirety by reference.

BACKGROUND OF THE INVENTION

1. Field of the Invention

The present invention relates to a method, an apparatus and a medium thereof for eliminating noise from a voice signal, and more particularly, to a noise elimination method and apparatus that can eliminate noise in real time and without estimating a position of a speaker.

2. Description of the Related Art

Recently, indoor mobile robots have drawn a lot of attention due to the increased interests in health, safety, home networks, and entertainment. To such mobile robots, human-robot interaction (HRI) is essential. Generally, a mobile robot includes a microphone, a vision system, an ultrasonic sensor, an infrared sensor, and a laser sensor. Efficient interactions between human beings and the mobile robot can be realized only when the mobile robot recognizes human beings and perceives its surroundings using such devices.

A voice and sound input system included in a mobile robot is crucial to the free-roaming of the mobile robot as well as the HRI. However, the voice is attenuated by distance and deteriorated by environmental noises and reverberation. Various sources of noise and reverberations from walls or other objects are present in an indoor environment. In addition, more low-frequency components of voice are reduced with respect to distance than high-frequency components. In the indoor environment containing noise, a voice input system that enables a free-roaming mobile robot to recognize a user's voice from several meters away and identify the position of the user is required for HRI.

It should be possible to use the voice input system for voice recognition after voice enhancement and noise elimination. However, referring to FIG. 1, in an environment of a mobile robot 110, interference sources 130, such as a television or a radio producing sounds of music, coexist with a speaker 120, i.e., a voice source.

Also, since the mobile robot 110 including a microphone and the speaker 120 is not stationary, it is very difficult to use a conventional beam-forming method for voice recognition. Further, as it moves, the mobile robot 110 must accurately estimate the position of the speaker 120 and eliminate noise in real time. However, the estimation of the position of the speaker 120 by the mobile robot 110 using a multi-channel microphone is not accurate enough to guarantee the performance of a conventional beam-former.

SUMMARY OF THE INVENTION

Accordingly, it is an aspect of the present invention to provide a noise elimination method and apparatus that can eliminate noise in real time without estimating a position of a speaker.

Additional aspects and/or advantages of the invention will be set forth in part in the description which follows and, in part, will be apparent from the description, or may be learned by practice of the invention.

The foregoing and/or other aspects of the present invention are achieved by providing a method of eliminating noise from an input signal including a voice signal mixed with a noise signal. The method includes detecting a noise section, in which only the noise signal is present, from the input signal, obtaining a weight to be used for the input signal from signals of the noise section, and filtering the input signal using the obtained weight.

The detecting of the noise section includes selecting a candidate section in which an average energy of the input signal increases continuously, and determining the selected candidate section as the noise section when the voice signal is not present in the selected candidate section.

The determining of the candidate section as the noise section includes determining the candidate section as the noise section when a length of the candidate section exceeds a predetermined critical value or when the voice signal is not detected from signals of the candidate section in a voice activity detection process.

The obtaining of the weight includes obtaining a covariance matrix using the signals of the candidate section accumulating a covariance matrix of a next candidate section to the obtained covariance matrix until it is determined that a predetermined amount of data is accumulated, and obtaining an eigenvector corresponding to a minimum eigenvalue to be used as the weight by decomposing the accumulated covariance matrices into eigenvalues.

It is another aspect of the present invention to provide a method of obtaining a weight to be used to filter noise from an input signal. The method includes selecting a candidate section in which an average energy of the input signal increases continuously, obtaining a covariance matrix using signals of the candidate section when it is determined that voice signal is not detected from the signals of the candidate section, obtaining a covariance matrix of a next candidate section, and accumulating the covariance matrix of the next candidate section to the obtained covariance matrix, and obtaining a weight by decomposing the accumulated covariance matrices into eigenvectors.

The selecting of the candidate section include selecting a section, in which a number of points at which a difference between average energy in a short section and average energy in a long section of the input signal exceeds a first critical value is greater than a predetermined number, as the candidate section.

In the obtaining and accumulating the covariance matrices, the covariance matrices of the candidate section may be accumulated to the accumulated covariance matrices when a length of the candidate section is greater than a predetermined length or when a voice signal is not detected from the candidate section.

It is another aspect of the present invention to provide an apparatus for eliminating noise from an input signal containing a voice signal mixed with a noise signal. The apparatus includes a weight-updating unit detecting a noise section, in which only the noise signal is present, from the input signal and obtaining a weight to be used for the input signal from signals of the noise section, and a filtering unit filtering the input signal using the obtained weight.

It is another aspect of the present invention to provide an apparatus for obtaining a weight to be used to filter noise from an input signal. The apparatus includes a candidate section selector selecting a candidate section in which an average energy of the input signal increases continuously, a covariance matrix accumulator obtaining a covariance matrix using signals of the candidate section when it is determined that voice is not detected from the signals of the candidate section, obtaining a covariance matrix of a next candidate section, and accumulating the covariance matrices of the next candidate section to the obtained covariance matrices, and a weight calculator calculating a weight by decomposing the accumulated covariance matrices into eigenvalues.

BRIEF DESCRIPTION OF THE DRAWINGS

These and/or other aspects and advantages of the invention will become more apparent and more readily appreciated from the following description of the embodiments taken in conjunction with the accompanying drawings of which:

FIG. 13 is a reference diagram illustrating an experimental environment for evaluating the performance of the multi-channel noise elimination method according to the present invention; and FIG. 14 is a table comparing the performances of the multi-channel noise elimination method and the conventional art in the experimental environment of FIG. 13.

DETAILED DESCRIPTION OF THE PREFERRED EMBODIMENTS

Figure 1:
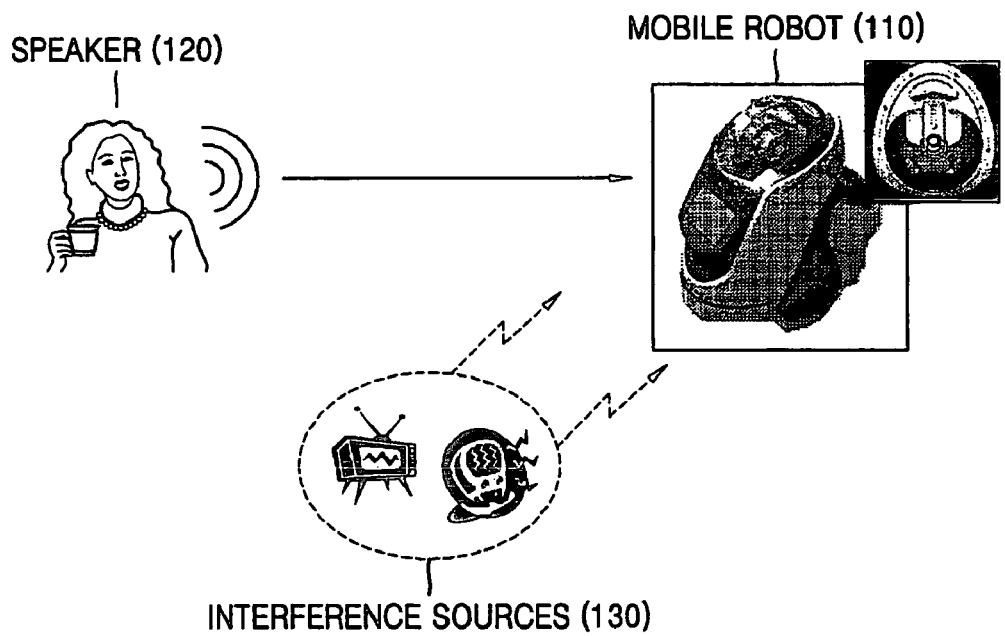
FIG. 1 is a reference diagram illustrating problems of the conventional art for noise elimination.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
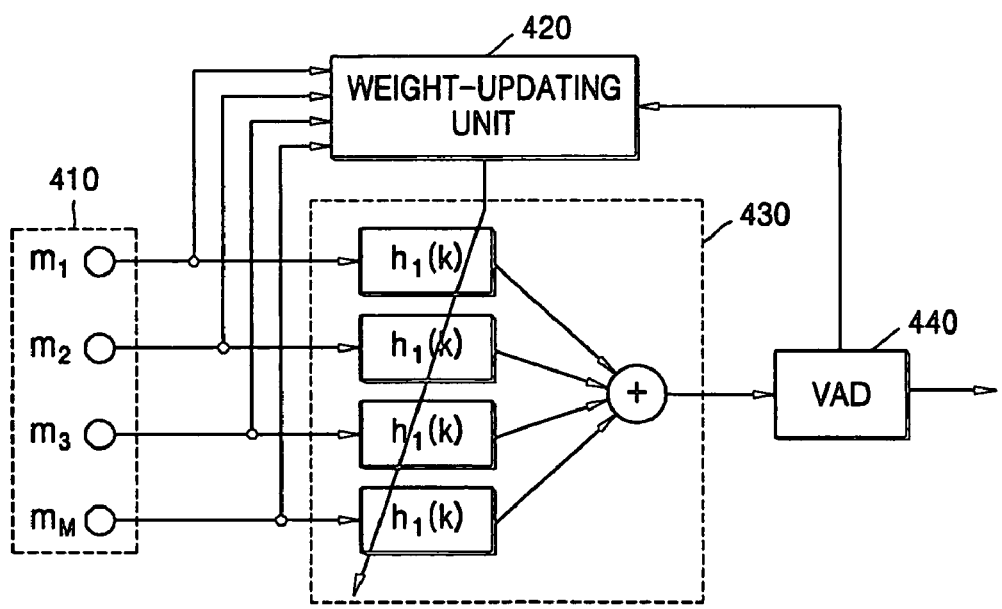
FIG. 2 is a schematic block diagram illustrating a multi-channel noise elimination apparatus according to an embodiment of the present invention

FIG. 2 is a schematic block diagram illustrating a multi-channel noise elimination apparatus according to an embodiment of the present invention. Since the position of a robot changes continuously, weights used to eliminate noise must be quickly updated to effectively eliminate noise and interference source signals. The noise elimination apparatus is largely divided into a unit for updating weights and a unit for multi-channel filtering and addition. The unit for updating weights operates according to environmental changes. The unit for multi-channel filtering and addition eliminates noise and a signal of an interference source from a target voice using obtained weights.

In terms of the entire system, a single channel noise eliminator that may be included in a voice activity detection (VAD) can effectively eliminate stationary noise such as fan noise and white noise. Thus, the multi-channel noise elimination apparatus may focus more on eliminating non-stationary noise and interference sources than eliminating stationary noise, which is taken into consideration when the unit for updating weights updates weights.

Referring to FIG. 2, the multi-channel noise elimination apparatus comprises a microphone array 410, a weight-updating unit 420, a multi-channel filtering and adding unit 430, and a VAD 440.

The microphone array 410 comprises at least one microphone and transmits voice signals or noise signals received from microphones to the weight-updating unit 420 or the multi-channel filtering and adding unit 430.

The weight-updating unit 420 calculates and updates weights to be multiplied by the voice signals received from the microphones to minimize noise included in the signals, and transmits the weights to the multi-channel filtering and adding unit 430. In particular, the weight-updating unit 420 calculates and updates weights that can minimize an average output power of signals in a noise section.

The multi-channel filtering and adding unit 430 multiplies the weights received from the weight-updating unit 420 by the signals received from the microphones, respectively, adds all of the multiplied signals, and transmits the multiplied signals to the VAD 440. The VAD 440 detects voice signals from the received signals. Generally, a single channel voice enhancer is included in the VAD 440 and filters signal-channel noise such as stationary noise.

Figure 3:
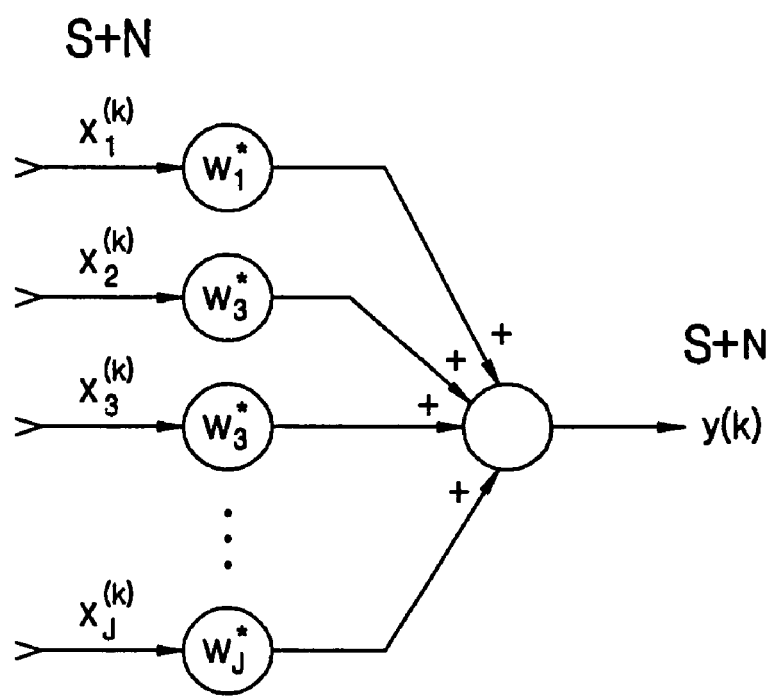
FIG. 3 illustrates the relationship between input signals and an output signal in the apparatus of FIG. 2.

A method of eliminating noise according to the present invention will now be described with reference to FIG. 3. Referring to FIG. 3, $x_1^{(k)}$ through $x_j^{(k)}$ indicate first through $j^{th}$ signals containing voice signals mixed with noise, which are received from j microphones. $w_1^*$ through $w_j^*$ indicate first through $j^{th}$ weights to be multiplied by the first through $j^{th}$ signals $x_1^{(k)}$ through $x_j^{(k)}$, respectively.

According to a conventional noise elimination method, signals containing sources (voice signals) mixed with noise are multiplied by weights. The multiplied signals are added to generate an output signal. Then, noise in the output signal is minimized. This is a general noise elimination method. In this method, it is important to find weights that can minimize the noise in the output signal. In the present invention, weights that can minimize noise in a noise section are used as weights that can minimize noise in the output signal.

The present invention minimizes an average output power of signals in the noise section. The average output power in the noise section may be expressed as $$E\{|y|^2\}=E\{|w^H x|^2\}.$$

where x indicates a signal in the noise section and w indicates a weight to be multiplied by the signal.

The average output power in the noise section can be minimized by obtaining w that minimizes a value of $$E\{|w^H x|^2\}. \text{ Here, } |w|^2=1.$$

Values of w that minimizes the average output power in the noise section can be obtained using a covariance matrix such as $R=E\{xx^H\}$, where the weight w is indicated as an eigenvector corresponding to a minimum eigenvalue of the covariance matrix R.

As described above, according to a method of obtaining a weight that minimizes the average output power in the noise section according to the present invention, a weight can be obtained only in the noise section without the voice of a speaker. Therefore, it is not required to estimate a direction in which the speaker will move.

Figure 4:
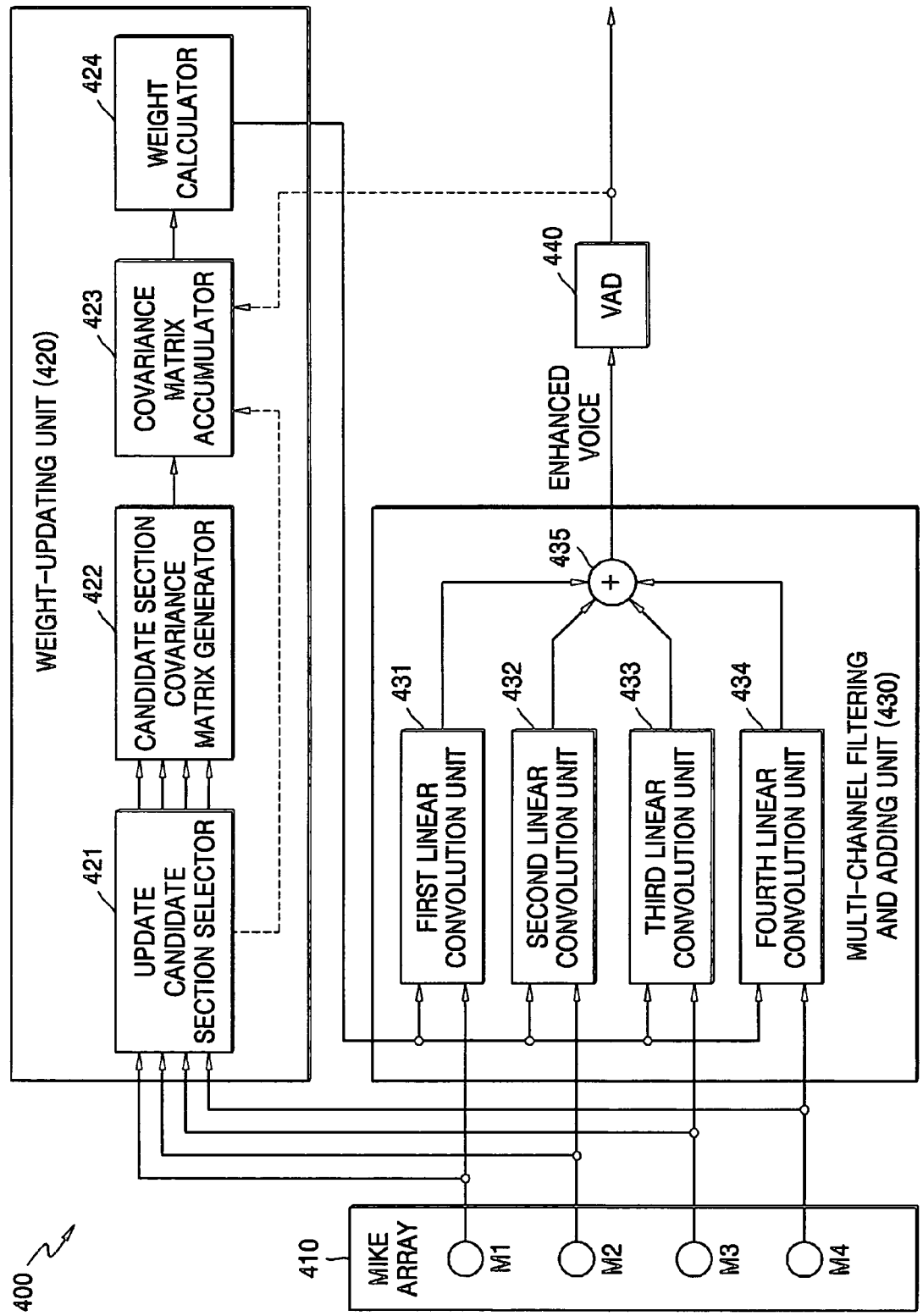
FIG. 4 is a specific block diagram illustrating the multi-channel noise elimination apparatus of FIG. 2.

FIG. 4 is a specific block diagram of a multi-channel noise elimination apparatus 400 of FIG. 2. Referring to FIG. 4, a microphone array 410 comprises four microphones. Input signals received from the four microphones are transmitted to a weight-updating unit 420 and a multi-channel filtering and adding unit 430.

The weight-updating unit 420 comprises an update candidate section selector 421, an update section covariance matrix generator 422, a covariance matrix accumulator 423, and a weight calculator 424.

The update candidate section selector 421 selects a noise section which comprises noise signals from the input signals. The update section covariance matrix generator 422 generates covariance matrices using signals of a selected candidate section. The covariance matrix accumulator 423 accumulates covariance matrices generated by the update section covariance matrix generator 422. The weight calculator 424 calculates weights using the covariance matrices accumulated by the covariance matrix accumulator 423 and provides the weights to the multi-channel filtering and adding unit 430.

The multi-channel filtering and adding unit 430 comprises a first linear convolution unit 431, a second linear convolution unit 432, a third linear convolution unit 433, a fourth linear convolution unit 434, and an adder 435.

The first linear convolution unit 431, the second linear convolution unit 432, the third linear convolution unit 433, and the fourth linear convolution unit 434 respectively multiply the input signals received from the four microphones by the respective weights received from the weight calculator 424 and transmit the input signals multiplied by the respective weights to the adder 435.

The adder 435 adds the input signals multiplied by the respective weights, which are received from the first linear convolution unit 431, the second linear convolution unit 432, the third linear convolution unit 433, and the fourth linear convolution unit 434, and outputs a signal resulted from the addition of the input signals to a VAD 440. The VAD 440 detects voice from the signal received from the adder 435.

Figure 5:
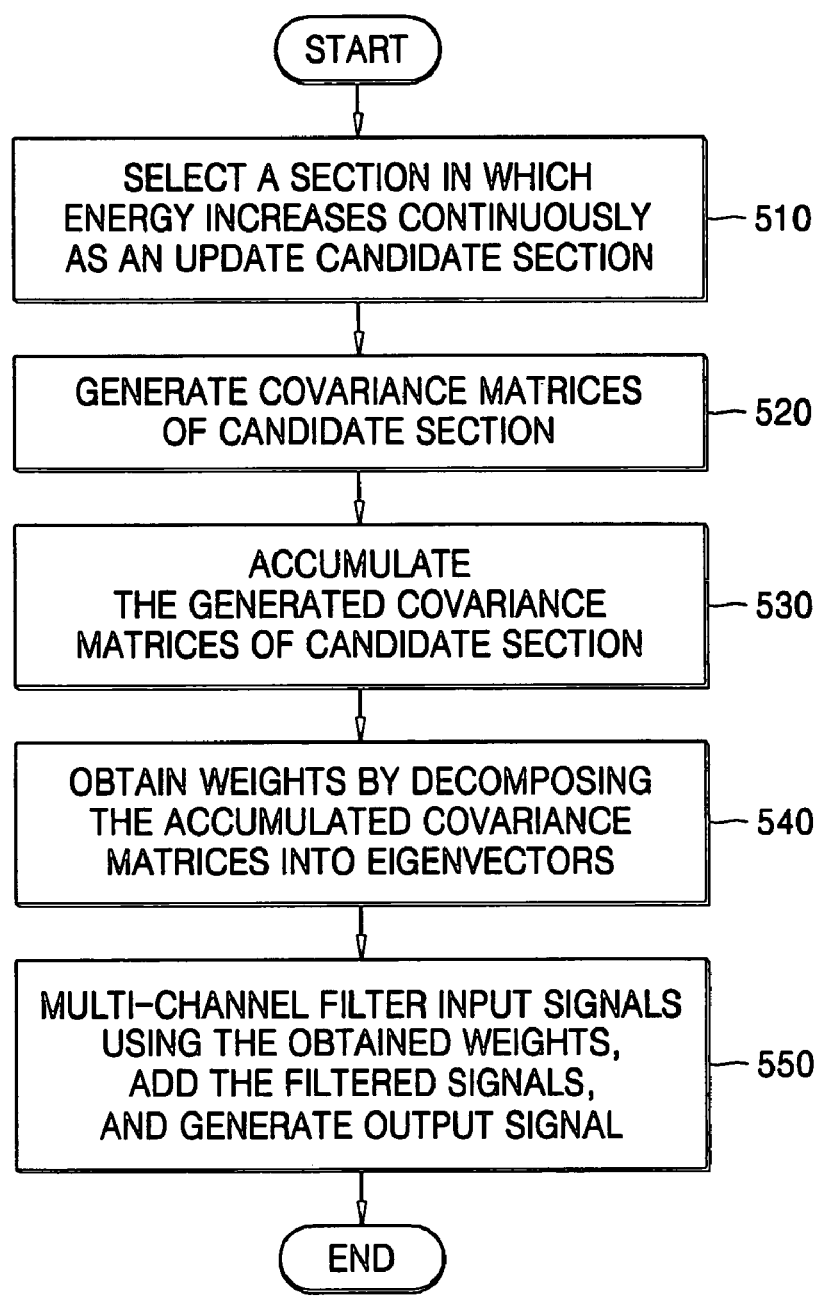
FIG. 5 is a flowchart illustrating a multi-channel noise elimination method according to the present invention.

FIG. 5 is a flowchart illustrating a multi-channel noise elimination method according to the present invention. Referring to FIG. 5, in operation 510, the update candidate section selector 421 selects a section in which average energy of a signal increases continuously as an update candidate section.

That is, an average energy in a short section $E_{short}$ of the signal is compared with an average energy in a long section $E_{long}$ of the signal and a section in which the difference between the average energies in the short and long sections $E_{short}$ and $E_{long}$ is greater than a predetermined critical value is selected as a candidate section for updating weights. Since the energy increases in a noise section, the average energy in the short section $E_{short}$ is greater than the average energy in the long section $E_{long}$ in the noise section. Hence, when the difference between the average energies in the short and long sections $E_{short}$ and $E_{long}$ is greater than the predetermined critical value in a section, the section may be determined as the candidate section.

The average energy in the short section $E_{short}$ is a value obtained by evaluating the average energy of the signal in the short section and defined as $$E_{short} = \lambda_{short} * E_{short} + (1-\lambda_{short}) * |x|^2, \lambda_{short} = 0.9.$$

The average energy in the long section $E_{long}$ is a value obtained by evaluating the average energy of the signal in the long section and defined as $$E_{long} = \lambda_{long} E_{long} + (1-\lambda_{long}) * |x|^2, \lambda_{long} = 0.99.$$

where $\lambda_{long}$ and $\lambda_{short}$ are values that may be changed according to noise characteristics and sampling frequencies. Any method by which an increase in energy can be detected may be used in addition to the method described above. The remaining operations 520 through 550 illustrated in FIG. 5 will be described later.

Figures 7A, 7B:
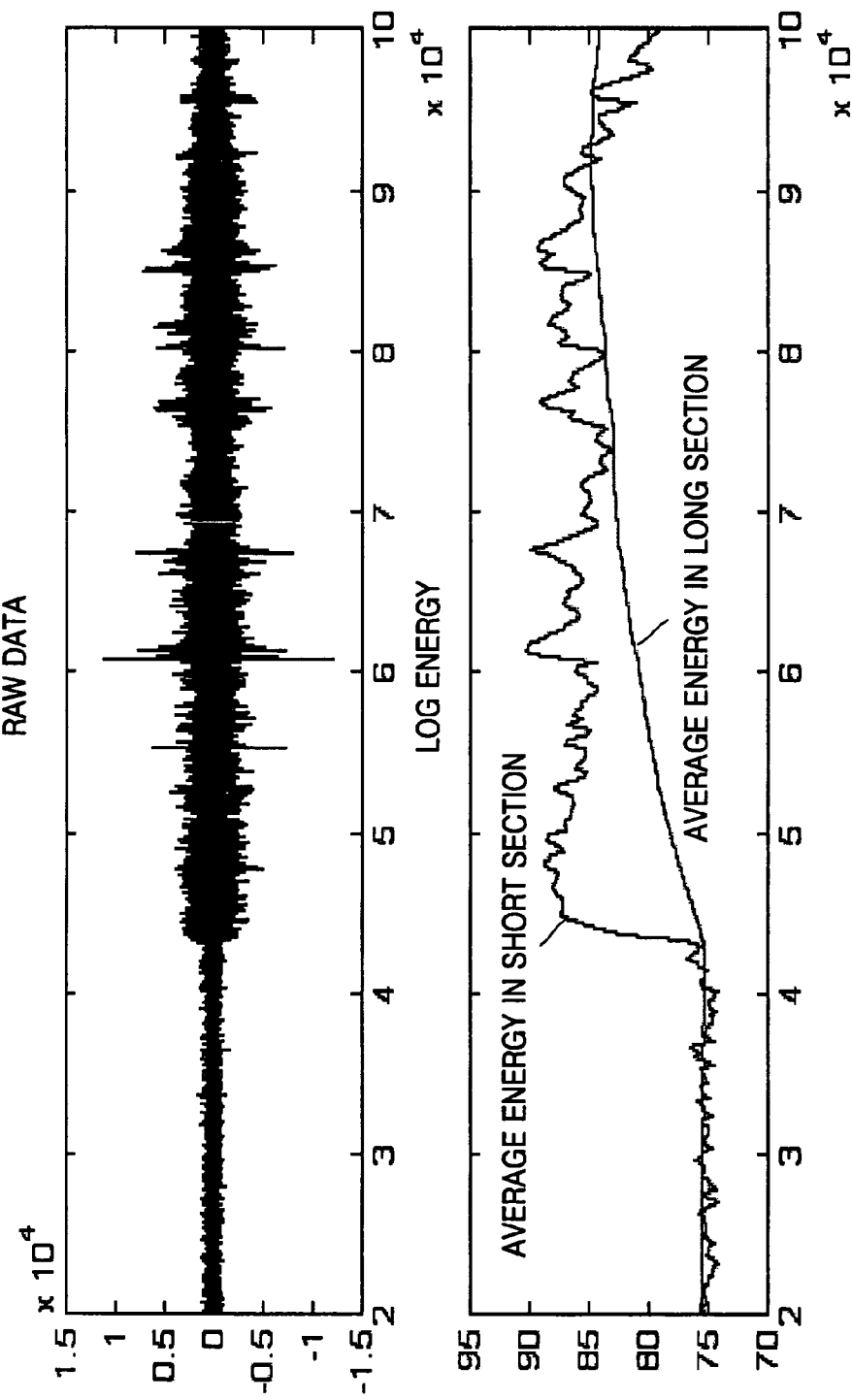
FIGS. 7A and 7B are graphs illustrating an update candidate section.

FIG. 7 illustrates graphs for explaining an update candidate section in accordance with operation 510 in FIG. 5 as mentioned above. Graph (a) of FIG. 7 shows the size of raw data on a time axis. Graph (b) of FIG. 7 shows average energies in the long and short sections $E_{long}$ and $E_{short}$ of the raw data shown in the graph (a).

Figure 6:
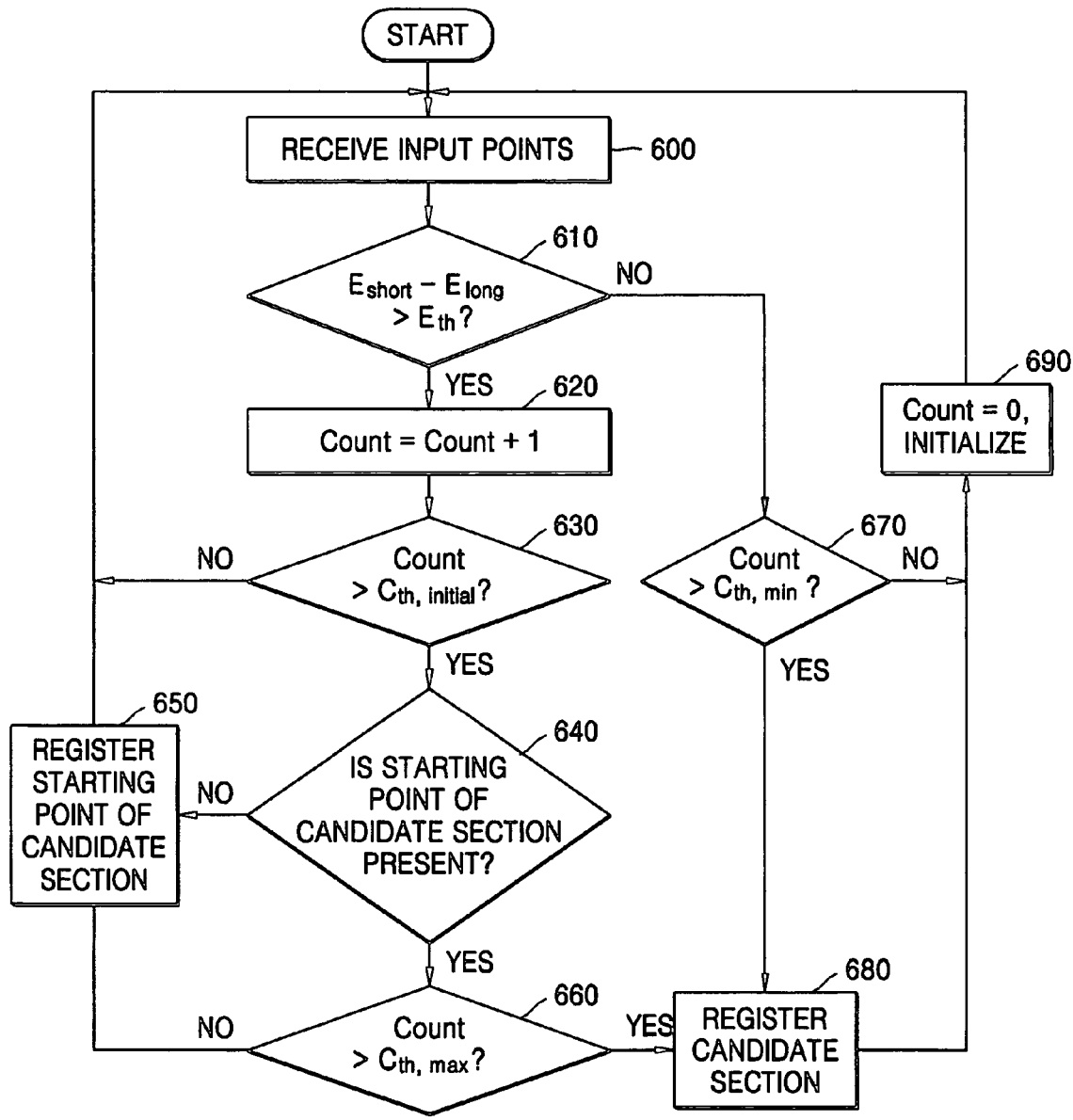
FIG. 6 is a flowchart illustrating a method of selecting an update candidate section according to the present invention.

Further, FIG. 6 is a flowchart illustrating a method of selecting an update candidate section according to operation 510 in FIG. 5 as mentioned above. Referring to FIG. 6, in operation 600, points based on whether the difference between the average energy in the short section $E_{short}$ and the average energy in the long section $E_{long}$ is greater than a predetermined critical value $E_{th}$ are received. Here, points may actually indicate average energy values in the short and long sections at each of the points as illustrated in graph (b) of FIG. 7.

From operation 600, the process moves to operation 610, where it is determined whether the difference between the average energy in the short section $E_{short}$ and the average energy in the long section $E_{long}$ is greater than the predetermined critical value $E_{th}$. When the difference between the average energy in the short section $E_{short}$ and the average energy in the long section $E_{long}$ is greater than the predetermined critical value $E_{th}$ in operation 610, the process moves to operation 620 where a count value is increased by one and from operation 620, the process moves to operation 630, where it is determined whether the count value is greater than an initial critical value $C_{th,initial}$.

When it is determined that an accumulated count value is greater than the initial count value $C_{th,initial}$, it means that the number of points at which the average energy in the short section $E_{short}$ is greater than the average energy in the long section $E_{long}$ is greater than a predetermined number. It also means that a starting point of a section in which energy of the input signals increases continuously is found.

From operation 630, the process moves to operation 640, where it is determined whether a starting point of a candidate section is present. When it is determined that the starting point of the candidate section is not present in operation 640, the process moves to operation 650, where the starting point of the candidate section is registered and the process returns to operation 600, where a next point is received.

When it is determined that the starting point of the candidate section is present in operation 640, the process moves to operation 660, where it is determined whether the accumulated count value is greater than $C_{th,max}$. When the accumulated count value is greater than $C_{th,max}$ in operation 660, the process moves to operation 680 where an end point of the candidate section is registered and from operation 680, the process moves to operation 690 where the count value is initialized to zero to register a next candidate section. When the accumulated count value is not greater than $C_{th,max}$ in operation 660, the process returns to operation 600, where a next point is received.

In operation 610, when the difference between the average energy in the short section $E_{short}$ and the average energy in the long section $E_{long}$ is smaller than the predetermined critical value $E_{th}$, the process moves to operation 670, where it is determined whether the accumulated count value is greater than $C_{th,min}$ (Thus, $C_{th,min}$ is a value greater than $C_{th,initial}$ and smaller than $C_{th,max}$. That is, $C_{th,min}$ indicates a minimum critical value by which the end point of the candidate section can be registered while the starting point of the candidate section is already registered.

When the accumulated count value is not greater than $C_{th,min}$ in operation 660, the starting point of the candidate section is registered but the difference between the average energy in the short section $E_{short}$ and the average energy in the long section $E_{long}$ is not large enough to register the end point of the candidate section. Consequently, the candidate section cannot be registered in operation 680. Thus, the starting point of the candidate section is ignored and the count value is initialized in operation 690. Then, a next candidate section is searched for.

When the accumulated count value is greater than $C_{th,min}$ in operation 660, the starting point of the candidate section is registered and the count value exceeds the minimum critical value $C_{th,min}$ such that the end point of the candidate section can be registered. Thus, the end point of the candidate section is registered in operation 680 and the candidate section is registered. Then, the count value is initialized to find a next candidate section in operation 690.

For example, it is assumed that $C_{th,initial}$ is four, $C_{th,min}$ is seven, and $C_{th,max}$ is ten. According to the method illustrated in FIG. 6, when the number of points at which the difference between the average energy in the short section $E_{short}$ and the average energy in the long section $E_{long}$ exceeds a predetermined critical value is greater than four, the starting point of a candidate section is registered.

When a point at which the difference between the average energy in the short section $E_{short}$ and the average energy in the long section $E_{long}$ does not exceed the predetermined critical value is generated before the number of points at which the difference between the average energy in the short section $E_{short}$ and the average energy in the long section $E_{long}$ exceeds the predetermined critical value becomes seven, the starting point of the candidate section is ignored and the count value is initialized to find a next candidate section.

When a point at which the difference between the average energy in the short section $E_{short}$ and the average energy in the long section $E_{long}$ does not exceed the predetermined critical value is generated after the number of points at which the difference between the average energy in the short section $E_{short}$ and the average energy in the long section $E_{long}$ exceeds the predetermined critical value becomes seven, the candidate section is registered.

When the number of points at which the difference between the average energy in the short section $E_{short}$ and the average energy in the long section $E_{long}$ exceeds the predetermined critical value is greater than four and the starting point of the candidate section is registered, if the number of points at which the difference between the average energy in the short section $E_{short}$ and the average energy in the long section $E_{long}$ exceeds the predetermined critical value and becomes larger than ten, the candidate section thus far is registered. When the candidate section is too long, weight updates are slowed down, making it that much difficult to quickly respond to noise changes.

Therefore, $C_{th,min}$ is the minimum length of the registered candidate section, and $C_{th,max}$ is the maximum length of the registered candidate section.

When a candidate section is selected in this way in operation 510 of FIG. 5, the process moves to operation 520, where the candidate section covariance matrix generator 422 generates candidate section covariance matrices using signals of the selected candidate section. From operation 520, the process moves to operation 530, where the covariance matrix accumulator 423 accumulates the candidate section covariance matrices. From operation 530, the process moves to operation 540, where the weight calculator 424 obtains weights by decomposing the accumulated covariance matrices into eigenvectors.

Figure 8:
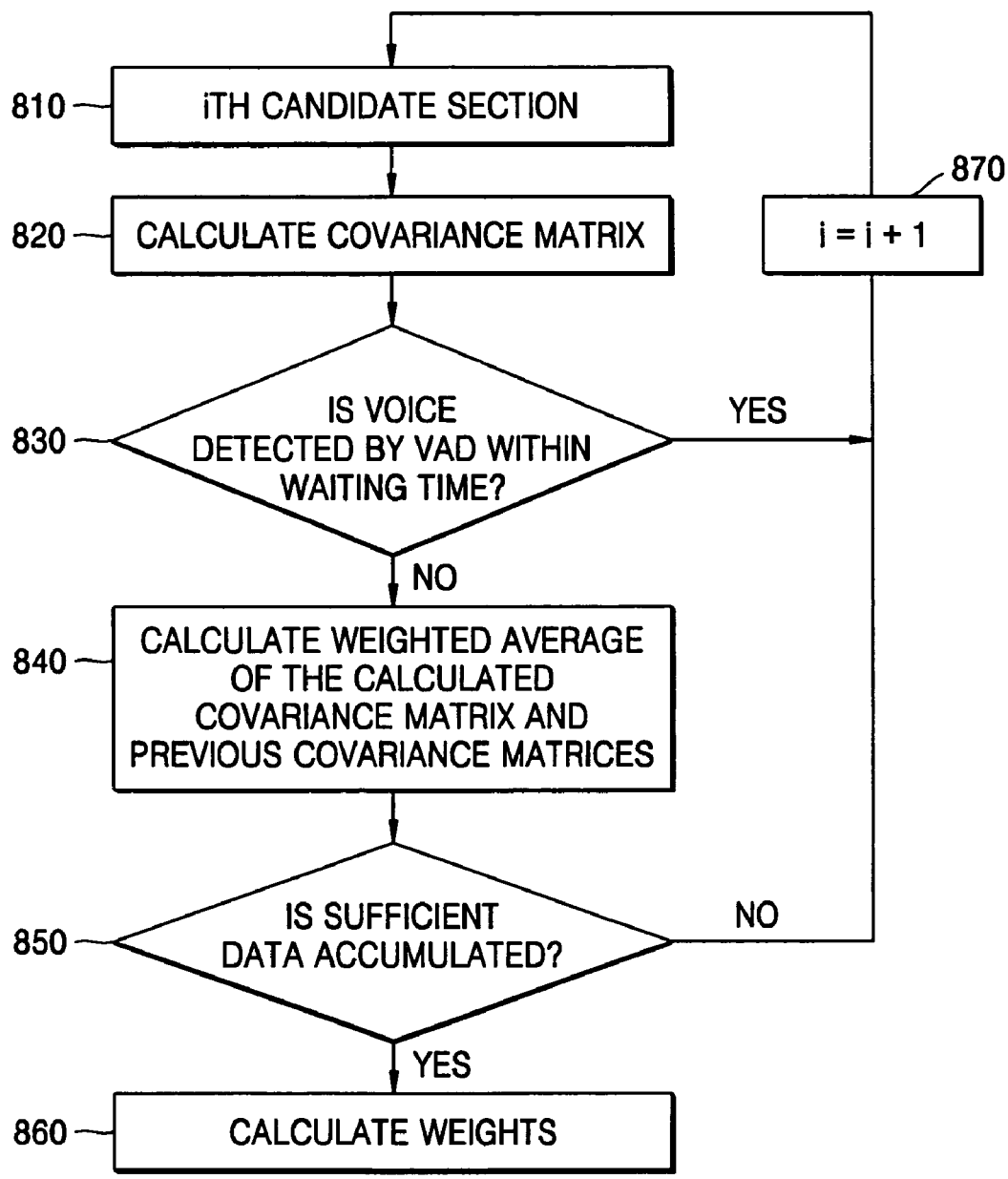
FIG. 8 is a flowchart illustrating a method of updating weights using a candidate section according to an embodiment of the present invention.

FIG. 8 illustrates a method of generating covariance matrices using a candidate section, accumulating the covariance matrices, and updating weights using the accumulated covariance matrices according to operations 520 through 540 as mentioned above. Referring to FIG. 8, in operation 810, an $i^{th}$ candidate section is received. From operation 810, the process moves to operation 820 where, covariance matrices are calculated using signals of the $i^{th}$ candidate section. From operation 820, the process moves to operation 830, where It is determined whether the VAD 440 detects a voice within a waiting time.

Figure 9:
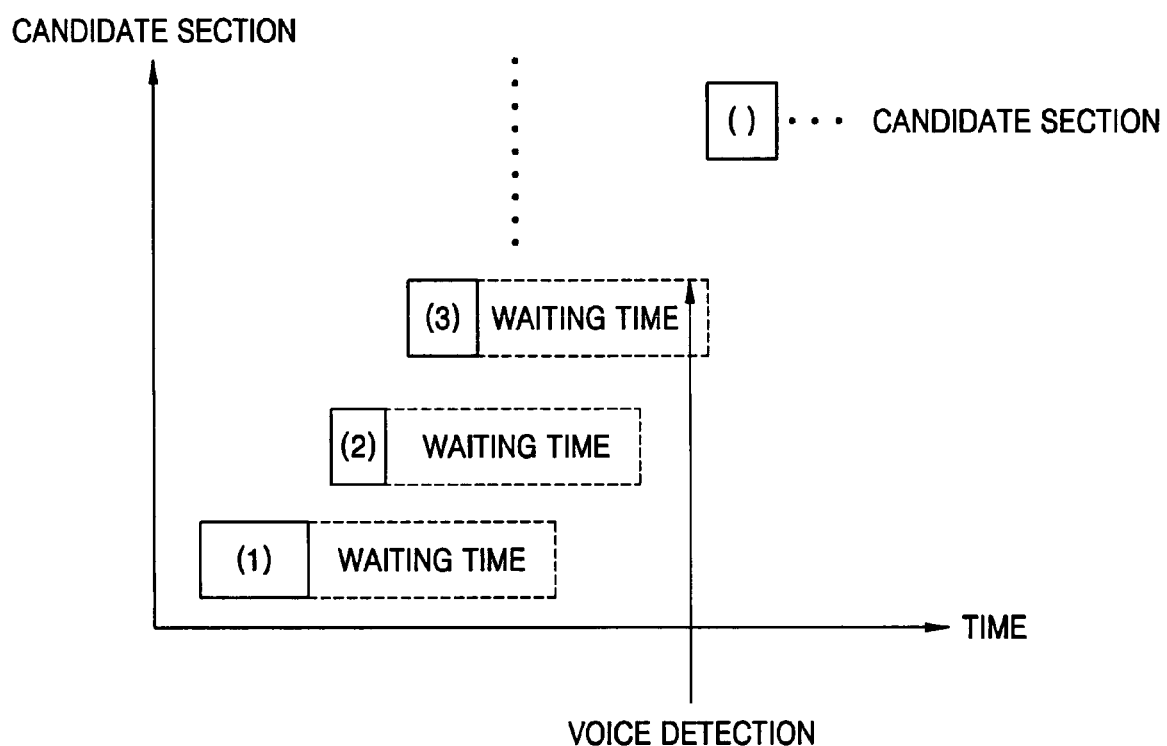
FIG. 9 is a graph illustrating the selection of a candidate section in the method of FIG. 8.

FIG. 9 illustrates candidate sections (1), (2), and (3). It is determined whether each of the candidate sections (1), (2), and (3) is to be used to calculate weights after the waiting time. That is, the candidate sections (1) and (2) are used to calculate weights since a voice signal is not detected within their respective waiting time while the candidate section (3) is not used to calculate weights since voice is detected within its waiting time.

Referring to FIG. 4, an update candidate section is selected by the update candidate section selector 421 and whether a voice signal is included in signals of the selected update candidate section is detected by the VAD 440. Since there is a predetermined delay until the covariance matrix accumulator 423 receives the result of the detection from the VAD 440, the waiting time is included in consideration of the delay.

In FIG. 8, when the VAD 440 detects a voice within the waiting time in operation 830, the candidate section cannot be used to calculate weights. Thus, i is increased by one in operation 870 and a next update candidate section is selected.

When the VAD 440 does not detect voice within the waiting time in operation 830, the candidate section can be used to calculate weights. Thus, from operation 830, the process moves to operation 840, where the covariance matrix of the candidate section is accumulated to previous covariance matrices and a weight average of the accumulated covariance matrices is calculated.

From operation 840, the process moves to operation 850, where It is determined whether sufficient data is accumulated in the accumulated covariance matrices. When it is determined that sufficient data is accumulated in operation 850, the process moves to operation 860, where weights are calculated. When it is determined that sufficient data is not accumulated in operation 850, the process moves to operation 870, where i is increased by one and a next update candidate section is selected.

Figure 10:
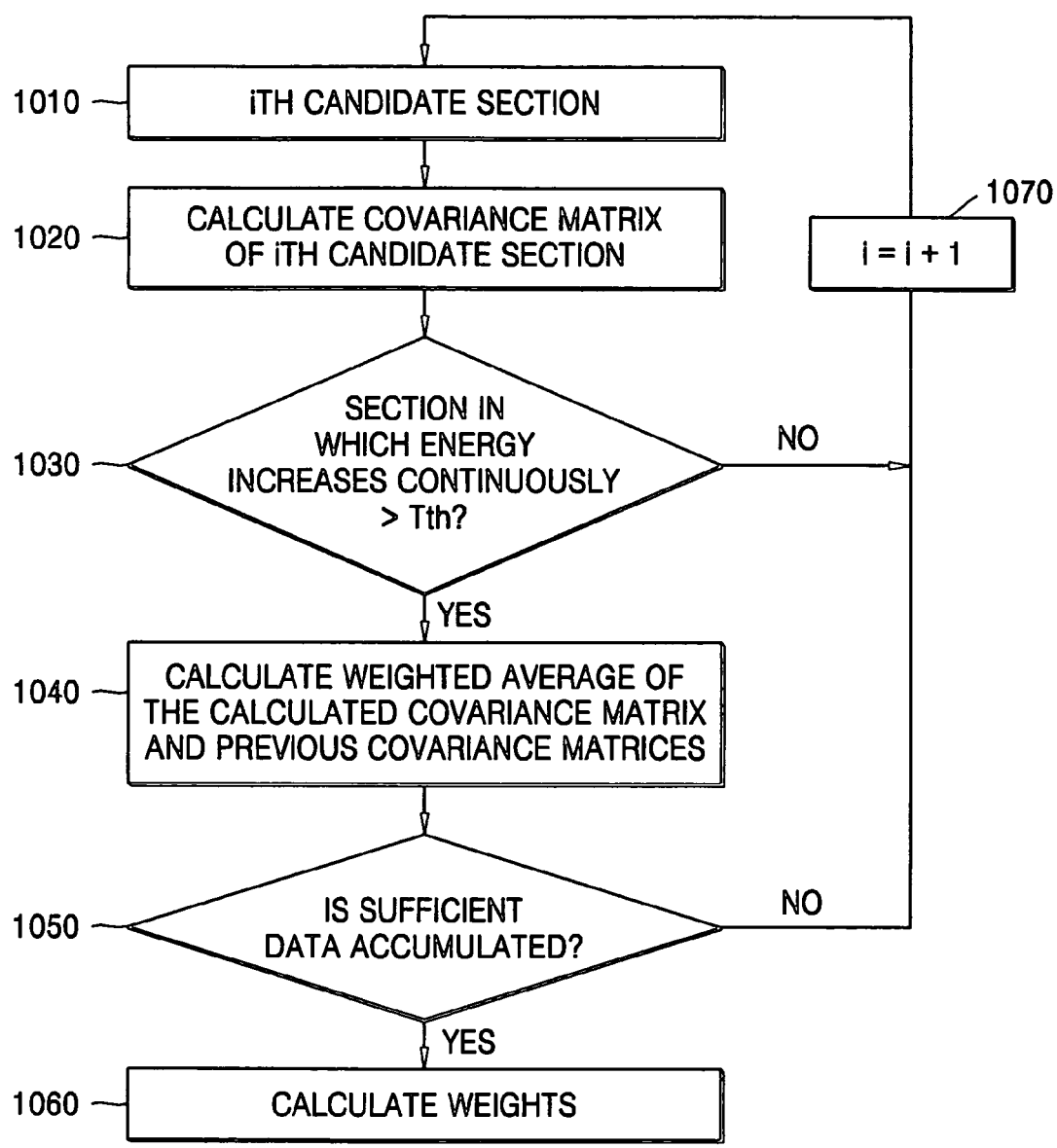
FIG. 10 is a flowchart illustrating a method of updating weights using a candidate section according to another embodiment of the present invention.

FIG. 10 is a flowchart illustrating a method of updating weights using a candidate section according to another embodiment of the present invention. Referring to FIG. 10, in operation 1010, an $i^{th}$ candidate section is received. From operation 1010, the process moves to operation 1020, where covariance matrices of the $i^{th}$ candidate section are calculated. It is determined whether the length of a section in which energy continuously increases, that is, the length of the $i^{th}$ candidate section, is greater than a predetermined critical value $T_{th}$ (operation 830).

In the embodiment illustrated in FIG. 8, the VAD 440 detects whether a voice is included in the $i^{th}$ candidate section.

However, in the embodiment illustrated in FIG. 10, whether a voice is included in the $i^{th}$ candidate section is determined by the length of a section in which energy continuously increases. Such a method considers the characteristic that there is a limit to the length of a voice in a section in which energy increases continuously. In other words, if the length of a section in which energy increases continuously exceeds a predetermined critical value, there is a high possibility that the section is not a voice but noise caused by external noise sources such as radio or television.

Figure 11:
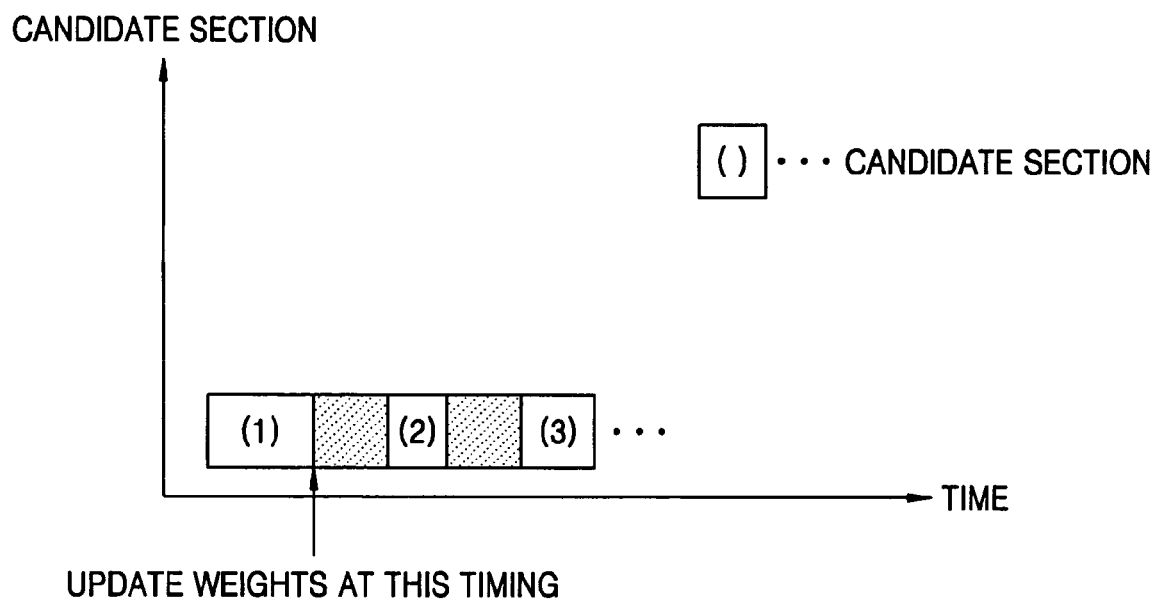
FIG. 11 is a graph illustrating the selection of a candidate section in the method of FIG. 10.

FIG. 11 illustrates candidate sections (1), (2), and (3). It can be determined whether a voice is included in the candidate sections (1), (2), and (3) based on their respective lengths. Hence, covariance matrices of the candidate sections (1), (2), and (3) can be calculated without waiting time as in FIG. 9 and immediately accumulated. Accordingly, unlike in FIG. 9, the candidate sections (1), (2), and (3) can be immediately accumulated.

When a section in which energy increases continuously is not greater than a predetermined critical value, it is determined that a voice is included in a corresponding candidate section. Thus, the candidate section cannot be used to calculate weights. Accordingly, i is increased by one in operation 1070 and a next candidate section is selected.

When the section in which an energy increase continuously is greater than the predetermined critical value, it is determined that a voice is not included in the candidate section. Accordingly, a covariance matrix of the candidate section is accumulated to previous covariance matrices and a weight average of the accumulated covariance matrices is calculated in operation 1040.

From operation 1040, the process moves to operation 1050, where it is determined whether sufficient data is accumulated in the accumulated covariance matrices. When it is determined that sufficient data is accumulated in operation 1050, the process moves to operation 1060, where weights are calculated. When it is determined that sufficient data is not accumulated in operation 1060, the process moves to operation 1070 where i is increased by one and a next update candidate section is selected.

An initial value of the covariance matrix of the candidate section is as follows.

$$R_{candi}(0,f)=0$$

The covariance matrix of an $(n+1)^{th}$ candidate section is calculated by $R_{candi}(n+1,f)=R_{candi}(n+1,f)+x(k,f)*x^H(k,f)$, where n indicates an index of a candidate section, k indicates a frame index within the candidate section, f indicates a frequency bin index in each candidate section, and x indicates a signal value of the candidate section. The covariance matrix within the candidate section may be calculated after the candidate section is registered. Alternatively, the covariance matrix of the candidate section may be calculated after the starting point of the candidate section is detected and the amount of calculation required may be divided.

The accumulation of the covariance matrix of the $(n+1)^{th}$ candidate section to the previous covariance matrices is calculated by $$R_{acc}(n+1,f)=\lambda_{acc}^{nFramecandi}R_{acc}(n,f)+(1-\lambda_{acc}^{nFrame\_candi})*R_{candi}(n+1,f), \text{ where}$$

nFramecandi indicates the number of frames accumulated in Rcandi, $\lambda_{acc}^{nFramecandi}$ may be 0.98 and changed by noise characteristics and sampling frequencies.

When it is determined that sufficient data is accumulated after accumulating covariance matrices of the candidate section, a value of R is decomposed into eigenvalues and an eigenvector corresponding to a minimum eigenvalue is selected from the eigenvalues.

The multi-channel filtering and adding unit 430 multi-channel filters the input signals using the calculated weights, adds the filtered signals, and generates an output signal in operation 550 shown in FIG. 5.

There are various methods of performing multi-channel filtering using weights. However, an overlap-add method is the most effective.

Figure 12A:
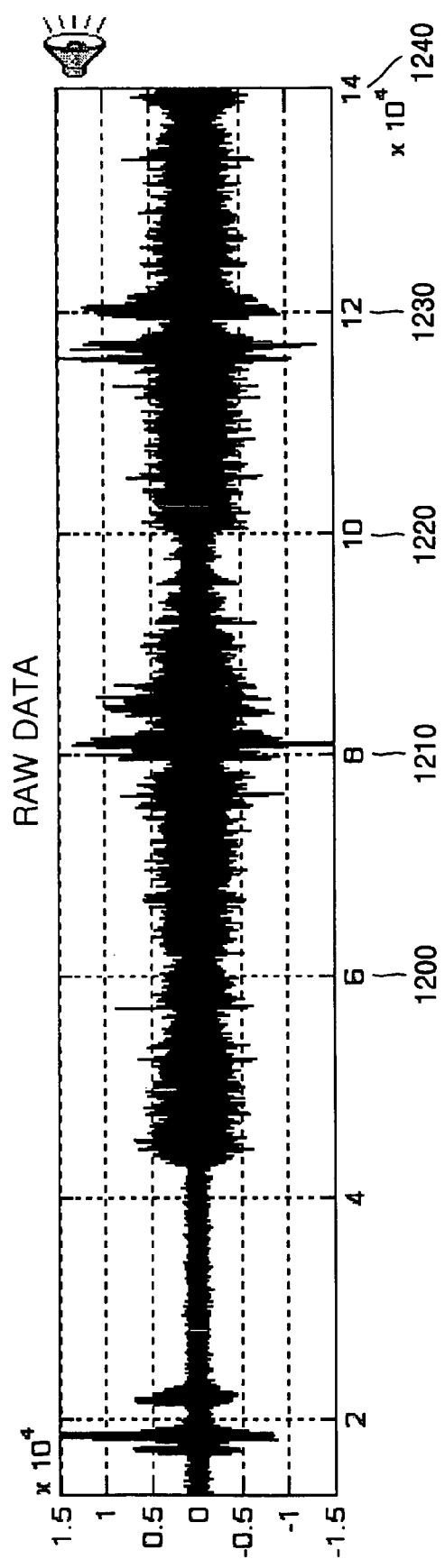
FIG. 12A through 12C are graphs illustrating the result of performing the multi-channel noise elimination method according to the present invention.
Figure 12B:
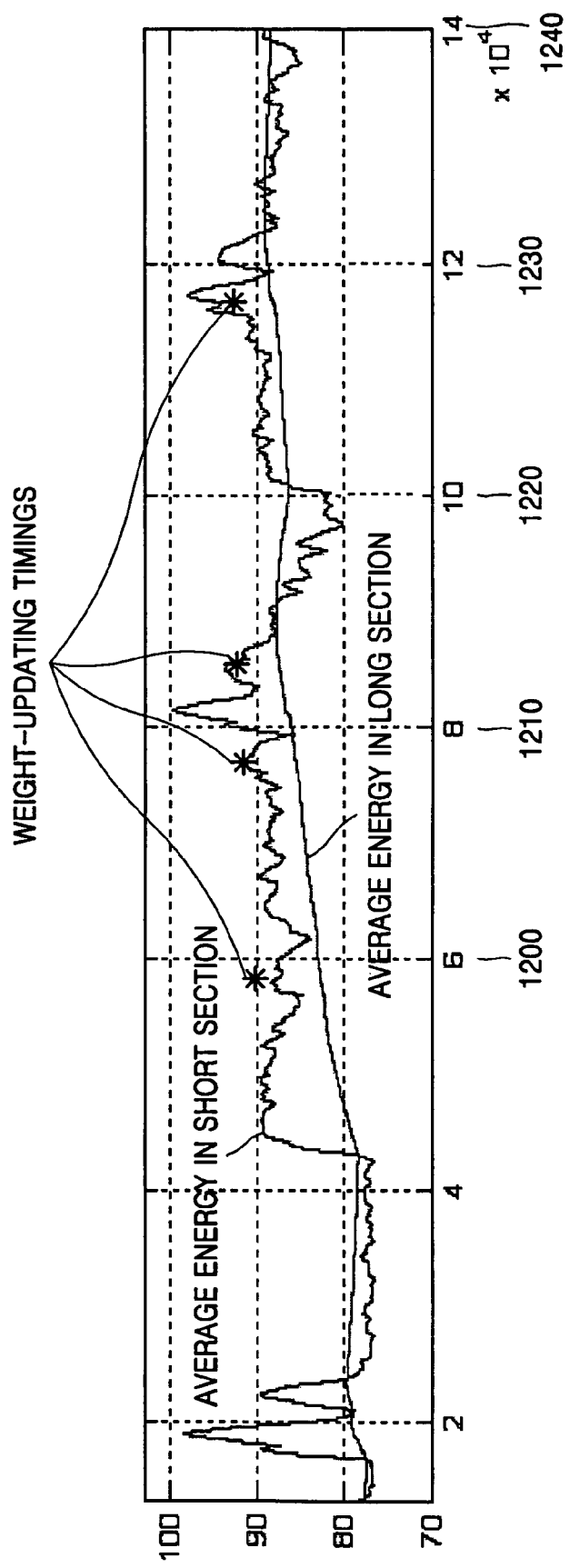
Figure 12C:
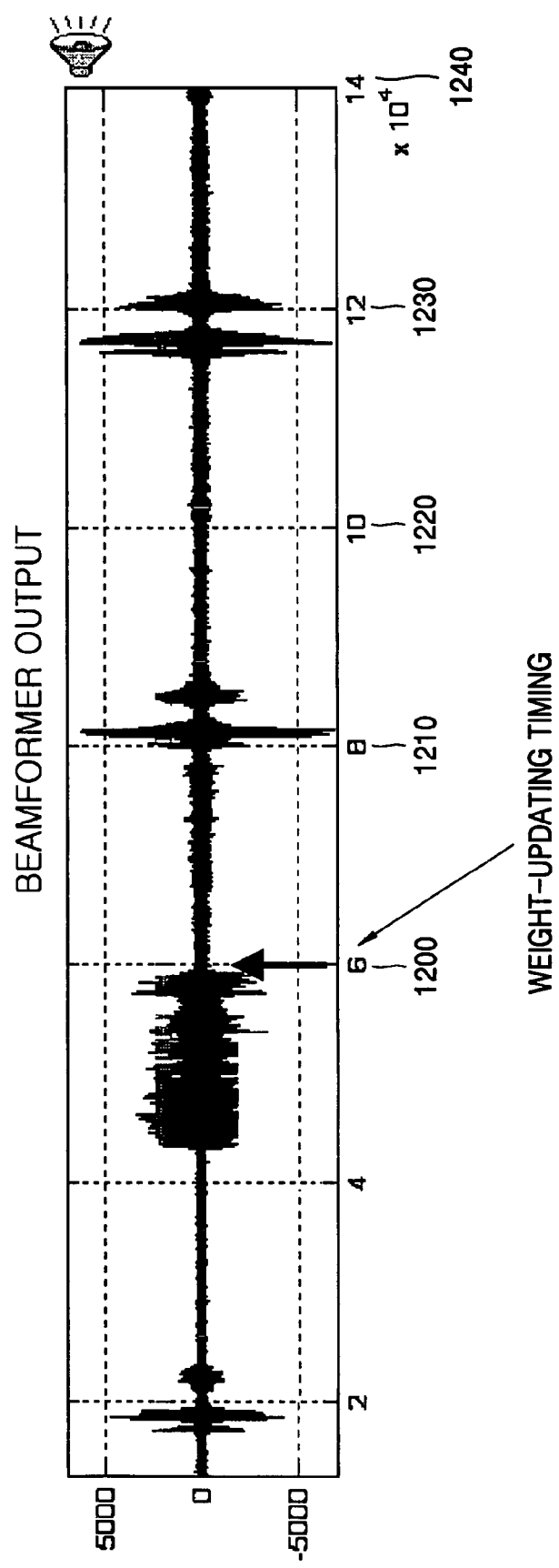

FIG. 12A through 12C are graphs illustrating the result of performing the multi-channel noise elimination method according to the present invention. FIG. 12A illustrates raw data input through a microphone. FIG. 12B illustrates average energy in a short section and average energy in a long section of the raw data of FIG. 12A. Referring to FIG. 12B, weights are updated in sections in which noise is made and increased, and such sections are marked. FIG. 12C illustrates data remained after noise is eliminated from the raw data of FIG. 12A as a result of updating weights as illustrated in FIG. 12B. Referring to FIG. 12C, it can be seen that the data includes much less noise than the raw data as a result of updating weights in a section ranging from 1200 to 1240.

FIG. 13 is a reference diagram illustrating an experimental environment for evaluating the performance of the multi-channel noise elimination method according to an embodiment of the present invention. Referring to FIG. 13, the experimental environment comprises fan noise and two pieces of music "Dancing Queen" and "Torna a Surriento" as noise sources. The position of noise is marked in a 270-degree direction from a robot. The fan noise is from inside the robot and not from external sources.

Positions of speakers are indicated by a circle "o". The speakers spoke 2 and 4 meters away and in the directions of 300, 330, 0, 30 and 60 degrees from the robot. Each speaker spoke 30 times and 540 pieces of experimental data were used. In this experimental environment, an experiment was conducted using a conventional noise elimination apparatus and the multi-channel noise elimination apparatus according to the present invention. The performances of the conventional apparatus and the apparatus according to the present invention in the experiment are compared in the table of FIG. 14.

FIG. 14 is a table for comparing the performances of the multi-channel noise elimination method and the conventional art in the experimental environment of FIG. 13. Referring to FIG. 14, the table shows the performances of the conventional art and the present invention when there was only the fan noise, when "Dancing Queen" was played while the fan noise was present, and when "Torna a Surriento" was played while the fan noise was present. Here, ETSI ES 202 212 (2-stage Wiener filter is used) was used as the single channel voice enhancer.

The #.CD indicates the number of correct detection and a detection rate (DR) indicates a proportion of the number of correct detection in the number of total utterance (# of correct detection/# of total utterance*100).

When only the fan noise was present, the #.CD and DR of the single channel voice enhancer+VAD were 511 and 94.63%, respectively. The #.CD and DR of the single channel voice enhancer+VAD according to the present invention were 540 and 100%, respectively. That is, when only the fan noise was present, the present invention showed a 5.37% higher detection performance than the conventional art.

When "Dancing Queen" was played while the fan noise was present, the #.CD and DR of the single channel voice enhancer+VAD were 335 and 51.86%, respectively. The #.CD and DR of the single channel voice enhancer+VAD according to the present invention were 489 and 90.56%, respectively. That is, when "Dancing Queen" was played while the noise was present, the present invention showed a 38.70% higher detection performance than the conventional art.

When "Torna a Surriento" was played while the fan noise was present, the #.CD and DR of the single channel voice enhancer+VAD were 292 and 51.59%, respectively. The #.CD and DR of the single channel voice enhancer+VAD according to the present invention were 460 and 85.19%, respectively. That is, when "Torna a Surriento" was played while the noise was present, the present invention showed a 33.60% higher detection performance than the conventional art.

As described above, according to the present invention, in a mobile robot environment, noise can be eliminated in real time, thereby effectively performing voice detection and recognition. In other words, non-stationary noise can be effectively eliminated in a home environment. Since the amount of calculation required is small, the present invention can be implemented as low-cost hardware. In addition, the present invention can be used in all applications of a conventional multi-channel noise eliminator.

The present invention can also be implemented as a computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of eliminating noise in real-time in a mobile robot environment from an input signal containing a voice signal mixed with a noise signal using a processor included in a mobile robot, the method comprising:
   determining a plurality of candidate sections in which an average energy of the input signal increases continuously over time, and a number of points at which a difference between average energy in a short section and average energy in a long section of the input signal exceeds a first critical value that is greater than a predetermined number;
   generating covariance matrices by using signals of the plurality of candidate sections;
   determining whether each of the candidate sections is a noise section in which no voice signal and only the noise signal is present;
   storing the covariance matrices of the plurality of candidate sections determined as the noise sections and accumulating the covariance matrices until it is determined that a predetermined amount of data is accumulated;
   using the processor included in the mobile robot to decompose the accumulated covariance matrices into eigenvalues;
   obtaining an eigenvector corresponding to a minimum eigenvalue among the eigenvalues generated by decomposing the accumulated covariance matrices;
   determining the obtained eigenvector as a weight; and
   filtering the input signal using the weight.

2. The method of claim 1, wherein the determining of the candidate section as the noise section comprises determining the candidate section as the noise section when a length of the candidate section exceeds a predetermined critical value.

3. The method of claim 1, wherein the determining of the candidate section as the noise section comprises determining the candidate section as the noise section when the voice signal is not detected from signals of the candidate section in a voice activity detection process.

4. A non-transitory computer-readable storage medium comprising computer readable code to control at least one processing element in a computer to implement the method of claim 1.

5. A method of obtaining a weight to be used to filter noise in real-time in a mobile robot environment from an input signal using a processor included in a mobile robot, the method comprising:
   determining a plurality of candidate sections in which an average energy of the input signal increases continuously over time, and a number of points at which a difference between average energy in a short section and average energy in a long section of the input signal exceeds a first critical value that is greater than a predetermined number;
   using the processor included in the mobile robot to generate covariance matrices using signals of the plurality of candidate sections;
   determining whether each of the candidate sections is a noise section in which no voice signal and only the noise signal is present;
   storing the covariance matrices of the plurality of candidate sections determined as the noise sections and accumulating the covariance matrices until it is determined that a predetermined amount of data is accumulated;
   using the processor to decompose the accumulated covariance matrices into eigenvalues;
   obtaining an eigenvector corresponding to a minimum eigenvalue among the eigenvalues generated by decomposing the accumulated covariance matrices; and
   determining the obtained eigenvector as a weight.

6. A non-transitory computer-readable storage medium comprising computer readable code to control at least one processing element in a computer to implement the method of claim 5.

7. An apparatus included in a mobile robot for eliminating noise from an input signal obtained by the mobile robot containing a voice signal mixed with a noise signal in real-time, in a mobile robot environment, the apparatus comprising:
   a weight-updating unit detecting a plurality of noise sections in which only the noise signal is present, from the input signal and obtaining a weight to be used for the input signal from signals of the noise sections; and
   a filtering unit filtering the input signal obtained by the mobile robot using the obtained weight,
   wherein the weight-updating unit comprises:
   a candidate section selector selecting a plurality of candidate sections in which an average energy of the input signal increases continuously over time, and a number of points at which a difference between average energy in a short section and average energy in a long section of the input signal exceeds a first critical value is greater than a predetermined number;

a covariance matrix generator generating covariance matrices by using signals of the plurality of candidate sections;

a covariance matrix accumulator determining whether each of the candidate sections is a noise section in which no voice signal and only the noise signal is present, storing the covariance matrices of the plurality of candidate sections determined as the noise sections and accumulating the covariance matrices until it is determined that a predetermined amount of data is accumulated; and a weight calculator decomposing the accumulated covariance matrices into eigenvalues, obtaining an eigenvector corresponding to a minimum eigenvalue among the eigenvalues generated by the decomposing of the accumulated covariance matrices into the eigenvalues, and determining the obtained eigenvector as a weight.

8. The apparatus of claim 7, wherein the covariance matrix accumulator determines the candidate section as the noise section when a length of the candidate section exceeds a predetermined critical value.

9. The apparatus of claim 7, wherein the covariance matrix accumulator determines the candidate section as the noise section when the voice signal is not detected from signals of the candidate section in a voice activity detection process.

10. An apparatus included in a mobile robot for obtaining a weight to be used to filter noise in real-time, in a mobile robot environment from an input signal obtained by the mobile robot, the apparatus comprising:

a candidate section selector selecting a plurality of candidate sections in which an average energy of the input signal obtained by the mobile robot increases continuously over time, and a number of points at which a difference between average energy in a short section and average energy in a long section of the input signal exceeds a first critical value is greater than a predetermined number;

a covariance matrix generator generating covariance matrices by using signals of the plurality of candidate sections;

a covariance matrix accumulator determining whether each of the candidate sections is a noise section in which no voice signal and only the noise signal is present, storing the covariance matrices of the plurality of candidate sections determined as the noise sections and accumulating the covariance matrices until it is determined that a predetermined amount of data is accumulated; and a weight calculator decomposing the accumulated covariance matrices into eigenvalues, obtaining an eigenvector corresponding to a minimum eigenvalue among the eigenvalues generated by the decomposing of the accumulated covariance matrices, and determining the obtained eigenvector as a weight.

* * * * *